United States Patent [19]

Balcom et al.

[11] 4,109,389
[45] Aug. 29, 1978

[54] SHAFT ANGLE TRANSDUCER

[75] Inventors: Orville R. Balcom, Lomita; Cleve R. Hildebrand, Torrance; Edward L. Pollard, Santa Ana, all of Calif.

[73] Assignee: Cetec Corporation, Santa Ana, Calif.

[21] Appl. No.: 664,550

[22] Filed: Mar. 8, 1976

[51] Int. Cl.$^2$ ............................................. G01C 17/26
[52] U.S. Cl. .............................. 33/363 K; 340/201 P; 340/190
[58] Field of Search ........................... 33/1 PT, 363 K; 250/231 SE, 211 K; 340/201 P, 204, 190

[56] References Cited

U.S. PATENT DOCUMENTS

| 1,750,242 | 3/1930 | Ostrolenk | 340/201 P |
|---|---|---|---|
| 2,236,543 | 4/1941 | McFaddan | 33/363 K |
| 2,370,000 | 2/1945 | Best | 33/363 K |
| 2,777,070 | 1/1957 | Stamper et al. | 33/363 K |
| 3,206,719 | 9/1965 | Pure | 340/190 |
| 3,461,229 | 8/1969 | Oppenheimer | 358/299 |
| 3,639,769 | 2/1972 | Clark | 250/211 K |
| 3,853,191 | 12/1974 | Yamagiwa | 250/231 SE |

Primary Examiner—Richard E. Aegerter
Assistant Examiner—John W. Shepperd
Attorney, Agent, or Firm—Harris, Kern, Wallen & Tinsley

[57] ABSTRACT

A shaft angle transducer particularly suited for use as a magnetic compass card for providing an output signal linear with angular movement over a wide range, such as plus and minus 40°, with no zero dead band. A member with a plurality of radial segments, each having relatively opaque and transparent portions, with the proportion of the portions changing from segment to segment to provide an output varying as a predetermined function of angular position. A sensor with radiation source and detector, with the segments moving between the source and detector, with the segments in a disc configuration and in a wheel configuration.

11 Claims, 6 Drawing Figures

SHAFT ANGLE TRANSDUCER

BACKGROUND OF THE INVENTION

This invention relates to a device for converting the rotation of a shaft to an electrical signal, typically known as a shaft angle transducer, and in particular, to a new and improved shaft angle transducer especially suited for use in a compass for a marine automatic pilot. A compass is used to provide an electrical input signal to an automatic pilot for a boat, with the signal indicating the heading of the boat. Desirably, the compass signal should be linear with angle over a wide range and have no zero dead band and no discontinuities. A compass typically comprises a card mounted on a pivot for rotation about a vertical axis, with the pivot permitting pitching and rolling of the boat. One or more magnets are mounted on the card for aligning the card with the earth's magnetic field. In order to avoid distrubing the operation of the compass, compass card position is typically read by optical systems. Typically the rotating compass card has a varying optical density and a lamp and photocell are positioned on opposite sides of the card, with the card varying the light transmission to the photocell as the card rotates on the pivot. Problems with manufacturing the variable density card and with accurate operation during pitching and rolling make this system unsatisfactory. In one variation, an opaque section of the compass card is eccentric with respect to the mounting and two photocells are utilized. However this configuration has not been satisfactory, particularly with regard to linearity.

Accordingly it is an object of the present invention to provide a new and improved shaft angle transducer which can provide an output linear with angular motion over a wide range, such as plus and minus 40°, without having a dead band and without having discontinuities in the output. A further object is to provide such a transducer wherein the linear characteristic is not adversely affected by pitching and rolling.

SUMMARY OF THE INVENTION

Conversion of compass card position to a linear voltage has not been accomplished in an economical manner in the past because the methods of detecting compass card position (light or magnetic field intensity) are not inherently linear. The most common method for detecting the compass card position involves the use of a light source, a photodetector, and a compass card whose light transmission varies as a function of angular position placed between the light source and the photodetector. A photographic process may be used in preparing the variable transmission card.

The density and resulting light transmission of a photographic emulsion can be made to vary from near zero (opaque, black) to maximum (clear). However transmission is not an easily controlled parameter and is a strong function of the type of emulsion, the degree of exposure and the development process. Thus the amount of light transmission as a function of angular position of the compass card is very difficult to control when the transmission depends only on the emulsion density characteristics.

The most common photodetector, the photoresistor, is not a linear device, i.e. the photoresistors resistance does not vary proportionally to the amount of light incident on it. In addition, the photodetector may be utilized in a bridge configuration in which the output voltage of the bridge is not a linear function of the photodetector resistance.

Contrasted to the poor control of emulsion density in the photographic process, the ability of the photographic process to consistently and accurately reproduce geometric patterns has been developed to a high degree. If one can divide the compass card up into small angular segments and create a geometric pattern which results in some well defined percentage of each segment being clear (100% transmission), and the rest being opaque (zero transmission), then the average transmission over the small angular area is equal to the percentage of clear area in the total small segment. If the angular segment is made small enough so that the photodetector receives light from the total segment and responds to the average light from the segment, the amount of average transmission of each segment can be well controlled and arbitrarily defined.

In the present invention the member such as the compass card is divided into a plurality of imaginary radial segments with each segment having opaque and transparent portions and with the proportion of the opaque and transparent portions in a segment changing from segment to segment as a predetermined function of angular position of the segments. The segments can be on a disc or on a wheel. In the preferred embodiment, a first group of the segments have continuous opaque and transparent portions, and a second group of the segments have one of the portions interrupted by the other. In the second group, the interrupted portion may have a one to one relation with the interrupting portion, and a third group of segments may be provided with a three to one relation. A fourth group may be provided with a seven to one relationship.

DESCRIPTION OF THE PREFERRED EMBODIMENTS

Figure 1:
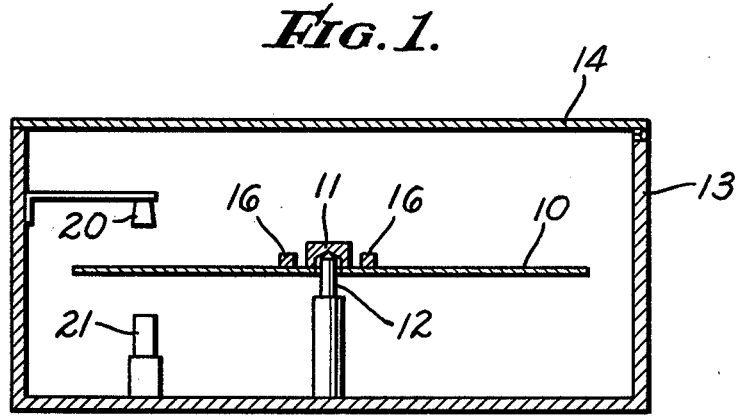
FIG. 1 is a vertical sectional view through a compass incorporating the presently preferred embodiment of the invention.
Figure 2:
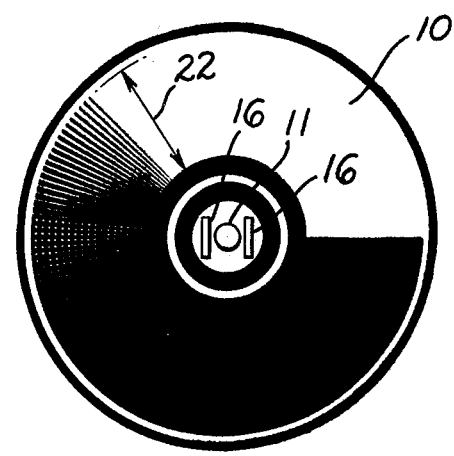
FIG. 2 is a top view of the instrument of FIG. 1.

Referring to FIGS. 1 and 2, a compass card or radiation control member 10 is fixed to a bushing 11 mounted on a spindle 12 in a housing 13. Access may be had to the interior of the housing 13 by means of a hinged cover 14. Magnets 16 are carried on the card 10 so that it functions as a magnetic compass card.

The card 10 is provided with a plurality of segments, each segment having relatively opaque and relatively transparent portions. The card preferably is made by conventional photographic processing using a highly transparent material as the base so that the transparent portions will have substantially 100% light transmission while the opaque portions will have substantially 0% transmission. A radiation source and a radiation detector are positioned on opposite sides of the segments of the card. Typically a lamp 20 is positioned above the card and a photodetector 21 is positioned below the card. In the specific embodiment illustrated, the active area 22 of the card has a radial distance of about three-quarters of an inch, and the lamp and detector have a working area of about one-quarter inch diameter. The lamp and photocell are spaced apart about one inch, permitting space for movement of the card with pitch and roll of the boat.

Figure 4:
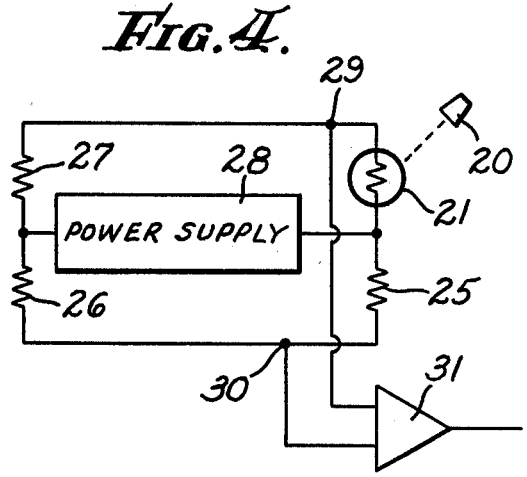
FIG. 4 is an electrical diagram illustrating a bridge circuit suitable for use with the instrument of FIGS. 1 and 2.

A typical electrical circuit for the instrument is shown in FIG. 4, with the photodetector 21 connected in a bridge with resistors 25, 26 and 27. A power supply 28 is connected at the junction of the photo diode 21 and resistor 25 and at the junction of the resistors 26, 27. The output of the bridge at junctions 29, 30 is connected as an input to a differential amplifier 31, with the amplifier output being a voltage signal which varies as a function of the amount of radiation from the lamp 20 reaching the photodetector 21.

Figure 3:
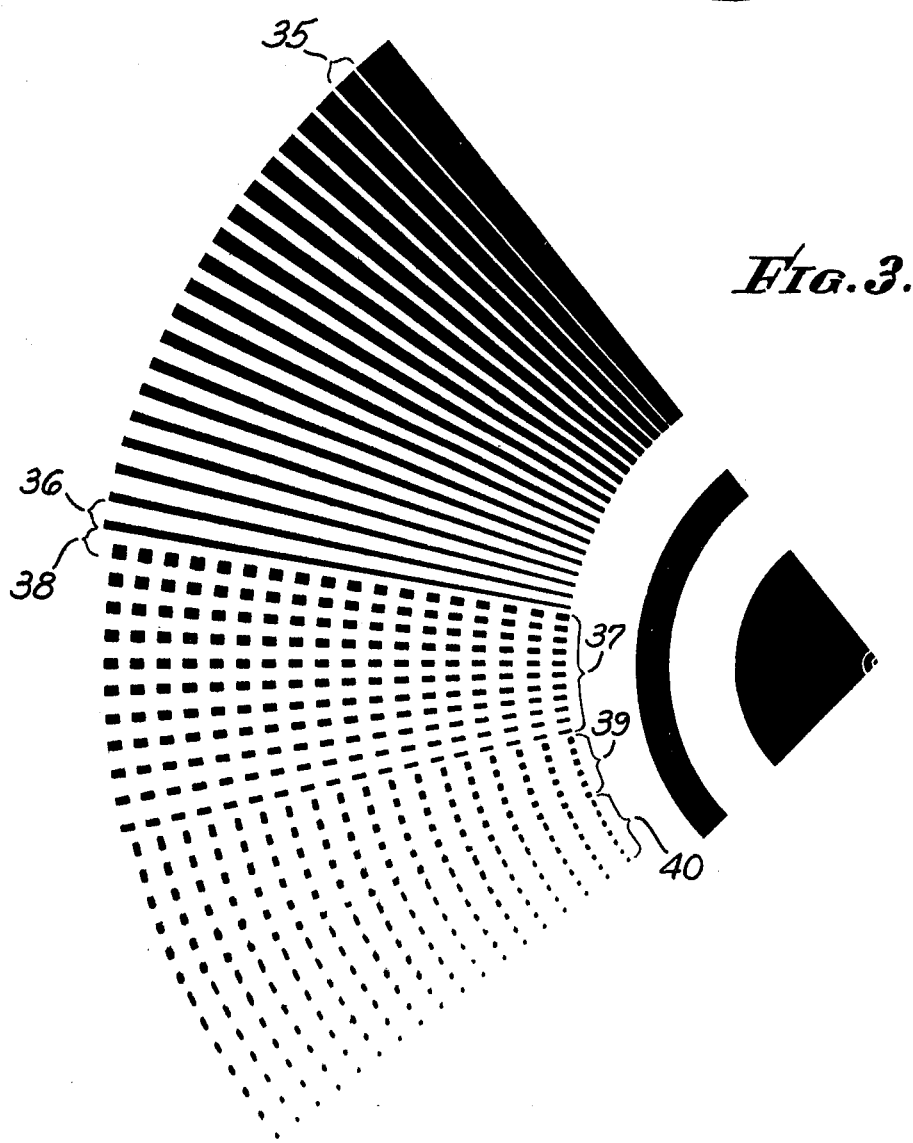
FIG. 3 is an enlarged view of a portion of a negative suitable for making the card of the instrument of FIGS. 1 and 2.

FIG. 3 illustrates the negative suitable for use in photograpically producing the card 10 of FIG. 2. The segment 35 has a relatively wide opaque portion and a relatively narrow transparent portion. The proportion of these portions changes with each segment, with the segment 36 having a relatively narrow opaque portion and a relatively wide transparent portion. The segments preferably are made equal in size for convenience in construction but do not have to have this characteristic. In the embodiment illustrated, each segment is 2°. The change in proportion of the portions from segment to segment may be made linear if desired. However, it is preferred to have the change in proportion nonlinear in order to compensate for other nonlinearities in the system, primarily that of the photodetector. The nonlinearity of the proportion is not clearly evident from the drawings due to the difficulty of illustrating the same. The resistance of the photodetector as a function of light intensity is measured. Knowing this resistance characteristic, the voltage output of the bridge as a function of light intensity is determined. It is desired to have the voltage output be linear with angular rotation of the card and since the light intensity at the photodetector is a direct function of density of the card (with a constant light source), the desired change in density for the segments is known. The proportion for the opaque and transparent portions is computed for each segment and the negative is produced, typically by cutting away appropriate portions of the opaque backing on a transparent sheet. When the remaining opaque portion in the negative approaches a minimum width determined by the characteristics of the photographic process, the single ray configuration as used in segments 35 and 36 can no longer be used. The next group 37 of rays has the opaque portion interrupted by the transparent portion to obtain the desired proportion of opaque and transparent portions. For example, segment 38 has the opaque portion considerably wider than segment 36, but this opaque portion is interrupted so that the actual opaque area in segment 38 is less than that in segment 36.

In the specific embodiment illustrated, three groups 37, 39, 40 of interrupted rays are utilized. In the group 37, 50% of the opaque portion is interrupted providing a one to one ratio of opaque and transparent portions along what would have been the opaque portion. In group 39, 75% of the opaque portion is interrupted giving a three to one ratio. In group 40, 87.5% of the opaque portion is interrupted giving a seven to one ratio. While these relationships are preferred for ease in computation, it is readily understood that other ratios could be utilized.

For satisfactory operation, the active area of the lamp and detector should overlie two or three segments. The proportion of the opaque and transparent portions in a segment is the same for all radial positions along the segment, so that the transmission characteristic is not adversely affected by pitch or roll of the boat which produces a pivoting motion of the card with respect to the sensor. While a particular relationship of opaque and transparent portions is shown in the card of FIG. 2 (and the reverse thereof in the negative of FIG. 3), it will be recognized that a reverse relationship can be utilized for the card if desired.

Figure 6:
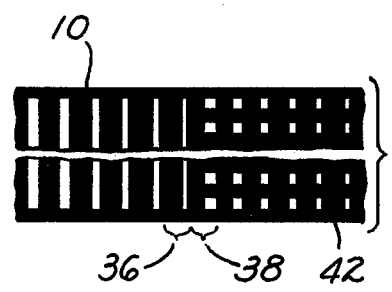
FIG. 6 is a view of a portion of the wheel of FIG. 5.
Figure 5:
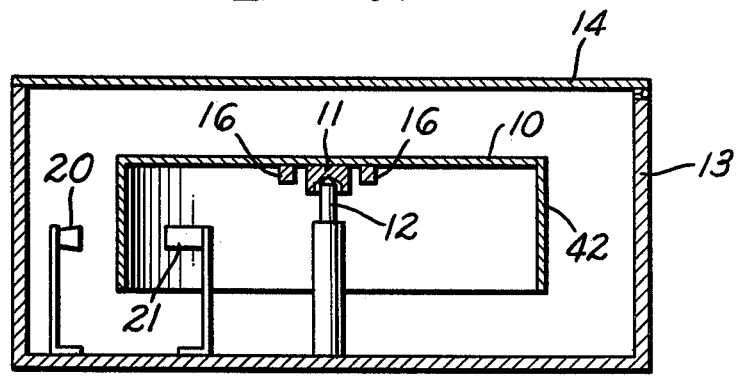
FIG. 5 is a view similar to that of FIG. 1 showing an alternative embodiment of the invention.

An alternative embodiment is illustrated in FIGS. 5 and 6, where corresponding elements are identified by the same reference numerals. The card 10 has a peripheral wheel 42 which carries the opaque and transparent segments, with a portion of the wheel shown in the unwrapped or flat configuration in FIG. 6. The construction and operation of the embodiment of FIGS. 5 and 6 is the same as described with the embodiment of FIGS. 1–3. While the invention has been described herein as used with a compass card for a marine compass providing an input to a marine automatic pilot, it will be recognized that the invention is suitable for other applications of shaft angle transducers and should not be limited to the marine compass field.

We claim:

1. A sensor for measuring angular motion about a vertical axis including in combination:
   a housing;
   a radiaton source and a radiation detector fixedly positioned in said housing in spaced relation, with said source directing radiation along a path to said detector; and
   a radiation control member having a magnet coupled thereto, with said housing and member having interengaging pivot means spaced from said path and supporting said member in said housing at a single point for pivoting of said member about a vertical axis relative to said housing and for pitch and roll of said member relative to said housing,
   a part of said member being disposed between said source and detector and extending across said path whereby pitch and roll of said member will position different radial regions of the member across said path,
   the part of said member between said source and detector having a plurality of radial segments, each segment having discrete opaque and transparent portions separated from corresponding portions of adjacent segments, with the opaque portions having a substantially uniform density and with the transparent portions having a substantially uniform density,
   the proportion of said opaque and transparent portions changing from segment to segment as a predetermined function of angular position of the segments about said vertical axis but with said proportion being the same in all said radial regions in each segment so that the transmission characteristic is not adversely affected by pitch or roll,
   said source and detector defining a radiation transmission zone along said path of a size to overlie a plurality of adjacent segments.

2. A member as defined in claim 1 wherein said segments include a first group with radially continuous opaque and transparent portions, a second group with one of said portions interrupted by the other in a ratio of one to one, and a third group with said one portion interrupted by said other portion in a ratio of three to one.

3. A member as defined in claim 2 wherein said segments include a fourth group with said one portion interrupted by said other portion in a ratio of seven to one.

4. A member as defined in claim 1 wherein said segments are in an annular part of said member.

5. A member as defined in claim 1 wherein said predetermined function is a nonlinear function.

6. A member as defined in claim 1 wherein the response of said radiation detector to radiation from said source is non-linear and the proportion of said opaque and transparent portions in a segment changes with each segment in a manner to compensate for nonlinearity in the radiation detector to provide a linear variation in sensor output voltage with respect to relative angular motion of said member.

7. A member as defined in claim 1 wherein said segments are equal in area.

8. A member as defined in claim 1 wherein said segments are equal angle segments.

9. A member as defined in claim 1 wherein said segments include a first group with radially continuous opaque and transparent portions, and a second group with one of said portions interrupted by the other.

10. A member as defined in claim 9 wherein said interruptions of said second group are substantially the same along a segment, and including a third group with said one portion interrupted by said other portion to a greater degree than in said second group.

11. A member as defined in claim 1 wherein said segments are in a planar part of said member.

* * * * *